US005528409A

United States Patent [19]

Cucci et al.

[11] Patent Number: 5,528,409
[45] Date of Patent: Jun. 18, 1996

[54] FIBER-OPTIC INTERFACE SYSTEM

[75] Inventors: Gerald R. Cucci, Minneapolis; Peter Stasz, St. Paul; Paul E. Bjork, Forest Lake, all of Minn.

[73] Assignee: NT International, Inc., Minneapolis, Minn.

[21] Appl. No.: 322,584

[22] Filed: Oct. 13, 1994

[51] Int. Cl.$^6$ .................................................. H04B 10/00
[52] U.S. Cl. .......................... 359/171; 359/152; 359/173
[58] Field of Search .................................. 359/143–144, 359/171, 152, 173–174, 179; 356/218

[56] References Cited

U.S. PATENT DOCUMENTS

| | | | |
|---|---|---|---|
| 4,345,482 | 8/1982 | Adolfsson et al. | 73/862.59 |
| 4,346,478 | 8/1982 | Sichling | 359/165 |
| 4,417,140 | 11/1983 | Adolfsson et al. | 250/227.23 |
| 4,434,510 | 2/1984 | Lemelson | 359/171 |
| 4,434,665 | 3/1984 | Adolfsson et al. | 73/724 |
| 4,490,606 | 12/1984 | Lockett et al. | 250/227.21 |
| 4,514,860 | 4/1985 | Adolfsson et al. | 359/110 |
| 4,521,684 | 6/1985 | Gilby et al. | 250/227.21 |
| 4,643,568 | 2/1987 | Forsberg | 356/218 |
| 4,651,571 | 3/1987 | McGlade | 73/773 |
| 4,704,607 | 11/1987 | Teather et al. | 340/825.07 |
| 4,713,540 | 12/1987 | Gilby et al. | 250/227.21 |
| 4,764,244 | 8/1988 | Chitty et al. | 216/20 |
| 4,820,916 | 4/1989 | Patriquin | 250/208.2 |
| 4,856,317 | 8/1989 | Pidorenko et al. | 73/4 R |
| 4,857,727 | 8/1989 | Lenz et al. | 359/168 |
| 5,099,144 | 3/1992 | Sai | 250/551 |
| 5,258,868 | 11/1993 | Jensen et al. | 359/168 |

OTHER PUBLICATIONS

Miller et al., "Wideband, Bidirectional Lightguide Communication With an Optically Powered Audio Channel," The Bell System Technical Journal, vol. 62, No. 7, Sep. 1982.
P. Hall, "Optically–Powered Sensor Network", IEE Colloquium on Distributed Optical Fiber Sensors, Digest 74, 1976.
Ohte et al., "Optically–Powered Transducer with Optical–fiber Data Link", SPIE vol. 478, Fiber Optic and Laser Sensors II (1984), pp. 33–38.
Bjork et al., "Optically Powered Sensors", Honeywell Systems and Research Center, pp. 336–339.
Miller, et al. "Optically Powered Speech Communications Over A Fiber Lightguide", The Bell System Technical Journal, Sep. 1979, pp. 1735–1741.
Goodenough, "Laser and Gallium–Arsenide Photodiode Array Power Data–System Via Glass Cable", Electronic Design, Jun. 25, 1992.
Hart Field Communications Protocol, pp. 2–6.

*Primary Examiner*—Leo Boudreau
*Assistant Examiner*—Kinfe-Michael Negash
*Attorney, Agent, or Firm*—Haugen and Nikolai

[57] ABSTRACT

A fiber-optic data-link used to interface a remote process variable sensor/transmitter to a local process control system includes a local light source module and a remote interface module interconnected by one or more optical fibers. Energy for operating the remote interface module and its associated process variable sensor/transmitter is provided by light energy transmitted from the local site to the remote site and converted at the remote site to an electrical signal. The local light source module and the remote interface module each may include a microcontroller. The controllers not only control the flow of status messages in either analog or digital or analog and digital form simultaneously from the remote site to the local site, but also insure the integrity of the system and minimizes the amount of optical power delivered to the remote site to that which is required to electrically power the remote interface module and the process variable sensor/transmitter, thus extending the useful life of the light source. The system is also arranged to check the integrity of the optical fibers to ensure that the light intensity is always below a minimum eye-safe value whenever the optical fiber is not correctly connected between the local light source module and the remote interface module.

23 Claims, 5 Drawing Sheets

| HEADER | VPD | VTR | ANALOG MSB | ANALOG LSB | CHECKSUM |

BYTE I  HEADER BITS CONDITION

B0 HART PROTOCOL
      B1 VTR ALARM
      B2 VPD ALARM
      B3 VPD PARAMETER
      B4 WDT ALARM
      B5 VTR ON
      B6 V LASER=FF
      B7 AWAKE

BYTE 2 VPD PHOTODIODE VOLTAGE
BYTE 3 VTR TRANSMITTER VOLTAGE
BYTE 4 DATA MSB
BYTE 5 DATA LSB
BYTE 6 CHECKSUM

*FIG. 5*

FIBER-OPTIC INTERFACE SYSTEM

BACKGROUND OF THE INVENTION

I. Field of the Invention

This invention relates generally to a system for interfacing a remote process variable sensor/transmitter to a local control system, and more particularly to a fiber-optic interface system in which power for the remote transmitter and associated interfacing electronics is provided by a light source located at the local site and in which data is transmitted, via a fiber-optic link, from the remote to the local site.

II. Discussion of the Prior Art

The Jensen et al. U.S. Pat. No. 5,258,868 describes an optical process variable transmitter of the type in which optical energy is transmitted from a local source to a remotely located process variable transmitter where it is converted at the remote location to electrical energy to power the remote electronics and in which the process variable information is also sent over a fiber-optic link to the local site. The system described in the Jensen et al. patent is deficient in not providing transmission of both analog and digital information nor does it provide adequate safeguard against possible eye damage to a technician if the optical fiber for transmitting the optical energy to the remote site is not connected to the converter circuitry. Moreover, the system described in the Jensen et al. patent is wasteful of optical energy. If a laser is used as the light source at the local site and the power it delivers to the remote site is not properly optimized, it results in a shortened life for the expensive laser employed.

Accordingly, it is a principal object of the present invention to provide an improved system for interfacing a remote process variable sensor/transmitter to a local control system in which optical power delivered from the local site is used to power the transmitter and electronics at the remote site.

A further object of the invention is to provide a light powered interface for a remote process variable transmitter that allows the simultaneous transmission of both analog and digital information from the PV transmitter to the local site.

Another object of the present invention is to provide a system of the type described in the foregoing object which incorporates a microprocessor-based controller at both the local site and the remote site where the microcontrollers oversee the delivery of optical power between the two sites.

Yet another object of the invention is to provide, in a system of the type described, a means whereby high intensity optical energy cannot be transmitted from the local site to the remote site unless the fiber-optic link is properly connected between the two.

Still a further object of the present invention is to provide a system of the type described in which the power delivered to the remote site by the optical light source (laser transmitter) at the local site is controlled by information provided to the local site by the remote site concerning the minimum power level necessary for operating the electronics at the remote site.

SUMMARY OF THE INVENTION

These and other objects of the invention are achieved by providing a first microcontroller means at the local site for controllably applying light energy to a first output terminal and for receiving digitally encoded optically-transmitted information from the remote site at a first input terminal to the microcontroller means. An analog transmitter means is electrically connected to the first microcontroller means at the local site and is adapted for selectively transmitting either analog or digital information or both simultaneously to a local control system. A second microcontroller means is located at the remote site, i.e., remotely from the first microcontroller means, for receiving one or both of analog and digital signals defining the state of a process variable sensed by a remote process variable transmitter and for delivering optically encoded status information to a second output terminal. A power supply means is coupled to the second microcontroller means and to the remote process variable transmitter for providing electrical power thereto. The power supply means includes an optical-to-electrical power converter having a second input terminal. At least one optical fiber is coupled between the first output terminal of the equipment at the local site and the second input terminal of the optical-to-electrical power converter at the remote site. The same or a second optical fiber is coupled between the second output terminal of the microcontroller means at the remote site and the first input terminal of the first microcontroller at the local site.

In accordance with one aspect of the invention, a means, including the first microcontroller means, initially applies light energy to the first output terminal at an eye-safe low value. The second microcontroller means is then responsive to receipt of the eye-safe low light energy value over the first optical fiber for transmitting a power-up command to the first microcontroller at the local site, via the optical fiber link, whereby additional light energy, above the eye-safe lower value, is applied to the optical fiber only if it is properly connected between the respective output and input terminals.

In accordance with a further feature of the invention, there is a light source power supply means at the local site for electrically energizing a light source, such as a gas laser, a laser diode or an LED, the light source including a means for modulating the intensity of the light energy delivered to the first output terminal. The first microcontroller means also includes a first microprocessor for controlling the light source power supply means and the light source modulating means. The first microprocessor receives power status information from the remotely located second microcontroller means, providing a closed-loop control over the optical energy being delivered from the local site to the remote site. The closed-loop control causes the current supplied to the laser light source to be as low as permissible while still providing adequate power to the remote interface and process variable transmitter.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which:

FIG. 5 illustrates a preferred message format and the significance of the message header bits thereof.

DESCRIPTION OF THE PREFERRED EMBODIMENT

Figure 1:
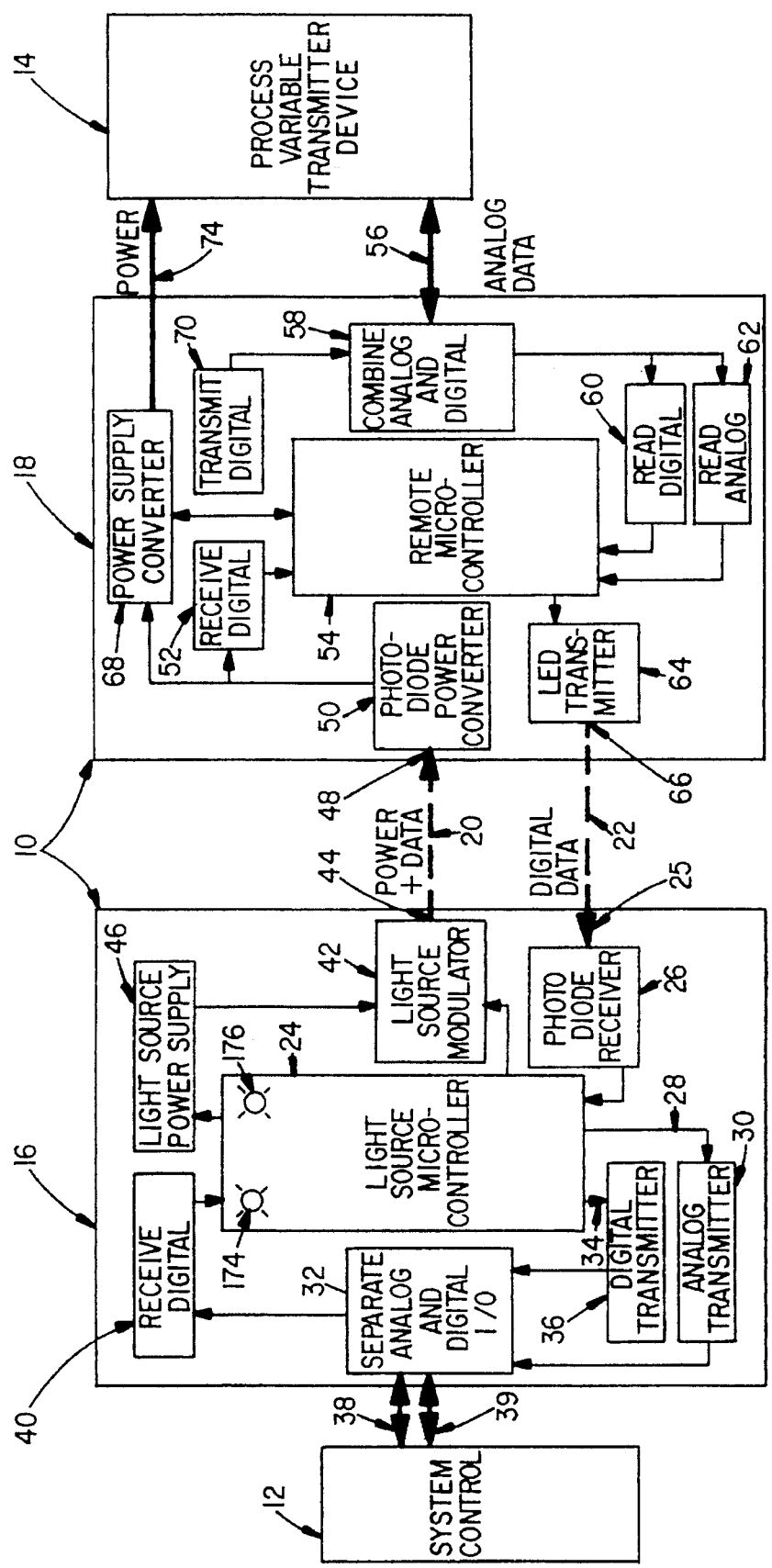
FIG. 1 is a system block diagram of the optically-powered, fiber-optical interface system of the present invention.

Referring first to FIG. 1, there is illustrated by means of a block diagram, the components of the optically-powered, fiber-optical data-link in accordance with the present invention. The system is indicated generally by numeral 10 and is adapted to interface a local system control module 12 to a remotely located process variable transmitter. Module 12 represents a device or system whose operating parameters are to be controlled as a function of information provided to it by the remotely located process variable sensor/transmitter module 14. The term "process variable" is meant to include one or more of such things as pressure, temperature, flow, motion, density or any other parameter whose value is of importance in the carrying out of some process by the system control module 12. The optically-powered, fiber-optic data-link 10 includes a light source and data processing module 16 and a remote interface module 18 that are coupled together by way of first and second optical fibers 20 and 22. While two discrete optical fibers are shown in FIG. 1, it is possible to couple a single optical fiber between the respective input and output terminals using conventional fiber-optical coupler devices, and limitation to a system having two discrete optical fibers is not to be inferred.

In the drawing of FIG. 1, the optical fibers are represented by dashed heavy lines. Customer-supplied electrical connections are shown in solid heavy line while internal electrical connections for the interface modules 16 and 18 are shown in a thin solid line representation.

Referring first to the light source module 16, it is seen to comprise a first microcontroller means 24 that is adapted to receive digital information provided to it over the second optical fiber 22 to a first input terminal 25 to which a photo-diode receiver 26 is connected. As will be explained in greater detail hereinbelow, the photo-diode receiver 26 comprises an optical-to-electrical transducer and pulse shaper for supplying digitally encoded status information to the microcontroller means 24. The microcontroller means 24 provides a first output over line 28 to an analog signal transmitter 30. The output from the analog transmitter 30 is applied as an input to analog/digital I/O circuit 32. This analog information on output 39 may, for example, be an industry standard current signal in the range of from 4 to 20 mA. It is the current amplitude of this signal that is indicative of the process variable measurement provided by the sensor/transmitter module 14. As those skilled in the art appreciate, 4 to 20 mA control loops are conventionally used in a wide variety of process control systems. Thus, the system of the present invention is compatible with that conventional scheme. It is also contemplated that the analog signal on line 39 may be a voltage level rather than a 4 to 20 mA current signal.

The system of the present invention is also compatible with the exchange of information in a digital rather than analog transmission scheme. Thus, the microcontroller 24 also is capable of outputting a digital value over line 34 to a digital transmitter 36, which is also coupled, via the analog/digital I/O interface module 32 and data link 38, to the system being controlled 12. The system being controlled 12 may also communicate back to the transmitter device 14. Here, digital or analog information is fed over the customer-supplied electrical link 38 to the digital receiver circuit 40, via the analog/digital I/O module 32. The digital receiver 40 provides its output to the microcontroller 24 where the message is properly formatted and applied to a light source modulator circuit 42, whereby frequency shift keying or other modulation techniques can be used to superimpose digital information onto the analog light level delivered to the optical fiber 20 at a first output terminal 44 of the light source module 16. Because the average value of the digital signal is zero, the superposition of the digital signal does not alter the analog information being transmitted. The microcontroller 24 also operates to control the amplitude of the optical energy by controlling the amount of electrical power (current) delivered from the light source power supply 46 to the light source modulator 42.

Turning now to the remote interface module 18, it is seen to include a second input terminal 48 to which the optical fiber 20 connects. This second input terminal receives the light energy delivered over the optical fiber 20 and converts that energy into an electrical signal proportional thereto, via a photo-diode power converter circuit 50. The information content, when sent in digital form, is detected by a digital receiver circuit 52 and applied as an input to a second microcontroller means 54. The microcontroller means 54 also receives signals defining the state of a process variable (PV) sensed by the remote process variable transmitter 14, via the customer-supplied electrical link 56. The information transmitted over the electrical connection 56 may be either in digital or analog form depending upon the type of PV sensor/transmitter 14 employed. In either event, the information from the PV sensor/transmitter 14 is fed into the analog and digital transceiver 58, with the digital component being fed through the digital interface circuit 60 to the remote microcontroller 54 and the analog component being delivered through the analog interface circuit 62 to the remote microcontroller 54. An A/D converter (not shown) located either in interface circuit 62 or forming part of the microcontroller 54 converts the analog output from PV transmitter to a digital quantity. The remote microcontroller is operative to transmit status information and messages, via a LED transmitter circuit 64, to a second output terminal 66 to which the optical fiber 22 is connected.

With continued reference to the remote interface module 18, it can also be seen that the output from the photo-diode power converter 50 is applied to a power supply converter 68 which is adapted to supply electrical energy to the remote process variable transmitter 14. The power supply converter 68 is controlled by the remote microcontroller 54 in a fashion to be described in greater detail hereinbelow.

It should also be mentioned at this point that the digital modulation carried by the optical signal being transmitted via optical fiber 20 is received via the photo-diode power converter 50 and the digital receiver 52 where it is then supplied as an input to the microprocessor forming a part of the remote microcontroller 54. The digital information to be transmitted to the remote PV sensor/transmitter device 14 is fed out of the remote microcontroller to a digital transmitter circuit 70 whose output feeds into the analog/digital combiner network 58 and, thence, over the customer-supplied electrical line 56 to the PV sensor/transmitter device 14.

Having described the constructional features of the fiber-optic interface system 10, it is deemed helpful to an understanding of the invention to at this point describe the overall functionality of the major modules employed. Considering first, the local light source module 16, the laser, LED or other light source output optical power from the light source modulator 42 is controlled to provide eye safety through a special power-up sequence and maximum laser life by operating at the lowest possible optical output power capable of providing adequate electrical power at the remote end for powering the electronic circuitry in the remote module 18 as well as in the PV sensor/transmitter device 14.

The light source eye safety feature is achieved by controlling the light source start-up time. Optical energy being transmitted out from the output terminal 44 and over the optical fiber 20 is ramped up from a low value. The very low-power optical output, when received by the photo-diode power converter 50 and, ultimately, the remote microcontroller 54, effectively "wakes-up" the remote microcontroller and causes it to output a digital status word, via LED transmitter 64, over the optical fiber 22 to the photo-diode receiver 26. During this time, the power output on line 74 to the PV transmitter 14 is disabled. Only if the photo-diode receiver 26 provides an appropriate input to the light source microcontroller 24 will that microcontroller instruct the light source power supply 46 to increase the optical power output from the light source modulator 42. Had one or the other of the optical fibers 20 or 22 been broken or not connected to its appropriate input terminal 48 or output terminal 66 of the remote interface module 18, the light source microcontroller 24 would not have received the appropriate status message and, as a result, the light source modulator 42 would not become powered-up to the point where the optical energy being transmitted would be sufficient to cause eye damage. Moreover, during normal operation of the system of the present invention, continuous checks are made at periodic intervals to insure that the remote interface module 18 is responding regularly with status data indicating that operating conditions are normal.

The light source module 16 at the local site also functions to provide analog signal reconversion. That is to say, the analog signal being transmitted from the PV transmitter device 14 is reconverted back to an analog voltage or a 4–20 mA current loop and fed over customer-supplied electrical line 39 to the control system 12.

The remote interface module 18 functions to measure and digitize the output from the photo-diode power converter 50, the power supply voltage to the transmitter 14, and the analog voltage from the transmitter. It then communicates status information as to how well the remote module 18 is functioning. More particularly, it carries out the power-up mode described above to insure eye safety and provided that all optical data-links are properly connected, assumes a normal operating mode in which all the pertinent data is sent to the local interface module 16 at predetermined data transmission rates. In the event of an error condition, such as a short circuit of the output current to the transmitter, a broken fiber in the power fiber link 20, etc., an error flag is sent back to the local interface module 16 to activate indicator lights in a manner yet to be described and appropriate corrective action can be initiated.

In addition to the above-described functions, the remote interface module 18 also functions to optimize the power converter 68. The purpose of this is to monitor the photo-converter operating point to insure that it remains in the most efficient optical-to-electrical conversion segment of its current/voltage curve. This is done by periodically creating an open circuit in the output power being delivered to the sensor/transmitter 14 and then heavily loading the photo-diode in the photo-diode power converter 50 while recording the photo-diode voltages in the memory of the microprocessor used in the remote microcontroller 54. The data is used to control the duty cycle of the D.C. to D.C. power converter 18 so as to optimize the photo-converter operating point. These efficiency improvements result in an increased light source lifetime because it can be operated at lower power levels. The open circuit voltage is measured once each second and the switching converter duty cycle is updated once every 1/60th second, i.e., once each cycle.

When the stored energy is sufficient to operate the PV sensor/transmitter device 14, the output power to it from the power supply converter 68 is switched on. If the stored energy is insufficient, the power is removed from the transmitter and an alarm condition flag is sent, via the data-link 58, 60 or 62, 64, and the optical fiber 22 to the photo-diode receiver 26.

Turning now to the flow charts of FIGS. 2, 3 and 4, which define the software programs executed by the microprocessors in the controllers 24 and 54, an explanation will be given as to how control is exerted over the hardware components by the respective local and remote microprocessor in the microcontrollers 24 and 25. The flow charts are written in sufficient detail so as to permit persons skilled in the art to write source code/object code for the selected microprocessors involved.

Figure 2:
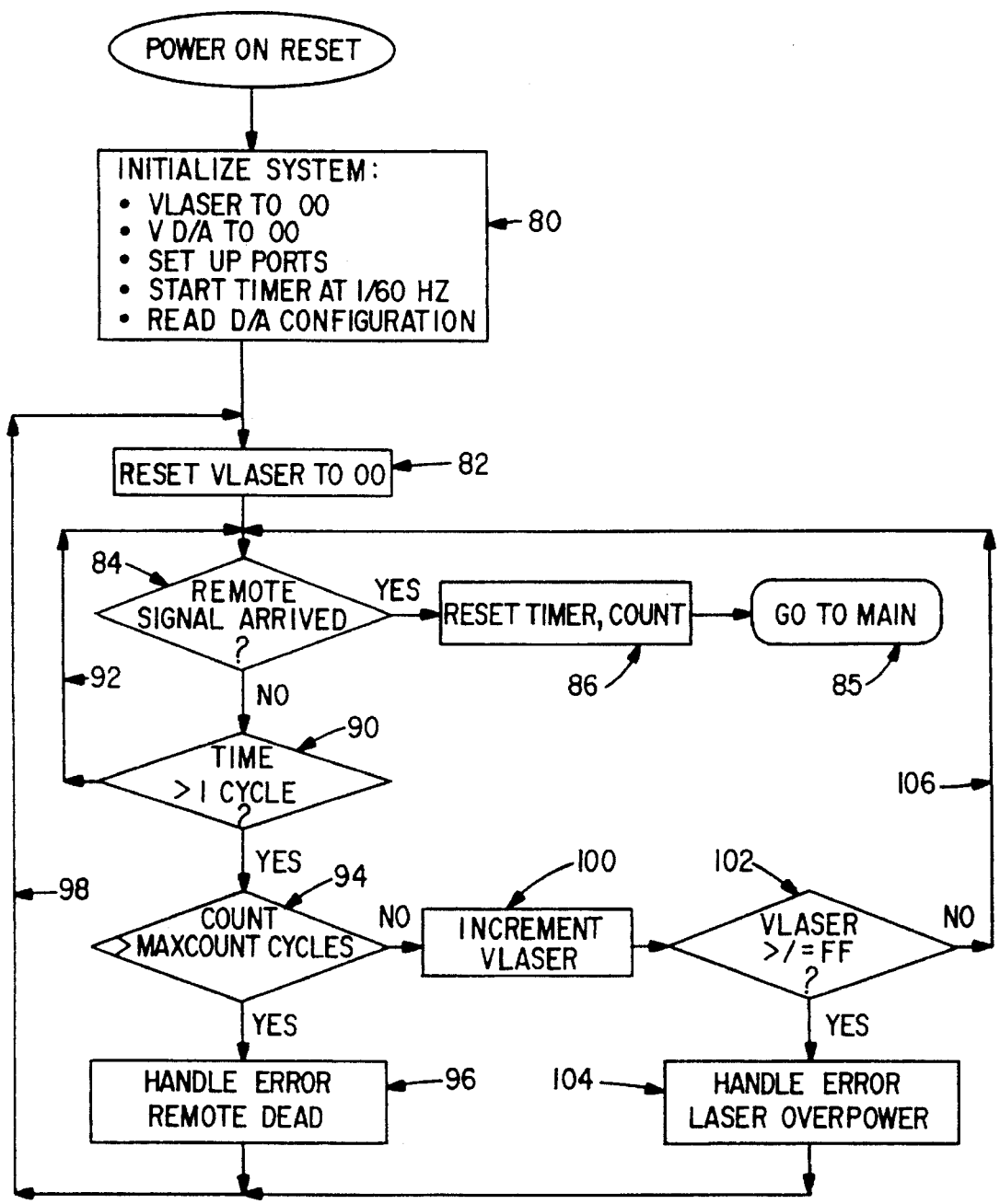
FIG. 2 is a software flow diagram of the power-up sequence carried out by the microcontroller located at the central site.
Figure 3:
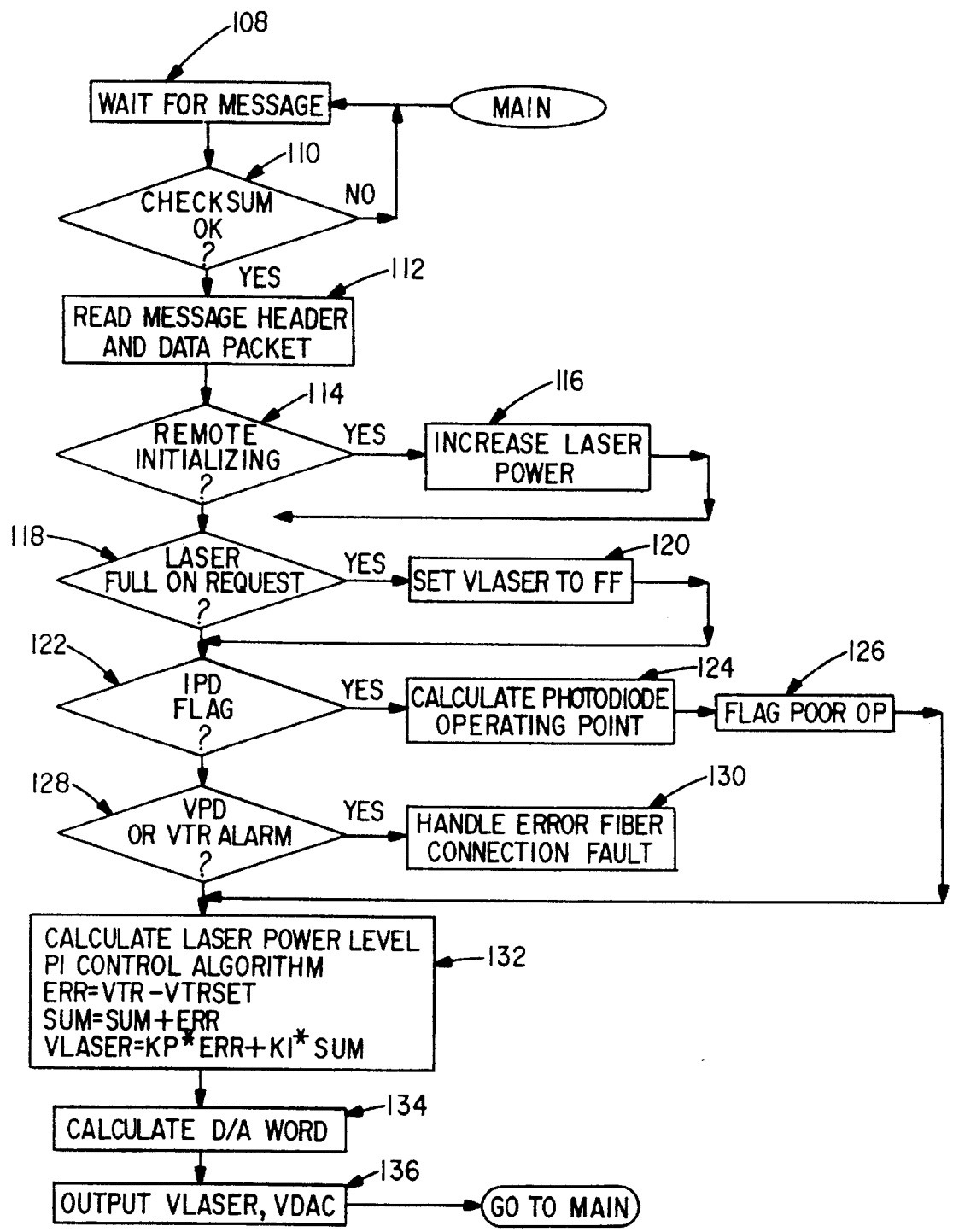
FIG. 3 is a software flow diagram of the main routine carried out by the microcontroller means at the local site following a successful power-up sequence.

Turning first to the flow chart of FIG. 2, depicted here is the routine used on a power-up situation. When the system is turned on, the microprocessor-based controller 24 "wakes-up" and undergoes an initialization sequence as represented by block 80. Assuming that the light source in question is a laser or laser diode, the voltage to the laser is first set to zero. Also, the analog output from the analog transmitter 30 is also set to zero and other housekeeping steps are executed to set up the microprocessors' ports, initiate the system timer at 1/60 Hz and to read the status of certain jumpers or dip switches defining a set of factory-programmed instructions that identify exactly the type of D/A conversion that is involved and the type of PV sensor/transmitter that is being used. For example, the jumpers or dip switches may establish whether it is a voltage signal from the remote transmitter to a 4–20 mA current loop on the local end or a particular combination of actual analog information that is to be transferred across the interface. While in the preferred embodiment, the communications loop is operating at a 60 Hz update rate, so that every 1/60th of a second the remote end sends all of its status and data information to the local end, those skilled in the art can appreciate that update rates other than 60 Hz can also be employed.

After the laser voltage is set to zero, the microcontroller 24 allows the light source power supply 46 to ramp-up the laser voltage, with the voltage being incremented every 1/60th of a second. During each such period, a test is made to see whether a signal has arrived from the remote end, thereby indicating that the remote end is also in the process of waking up because it is now receiving power, albeit at a low level, over the optical data-link 20 as already described. A test is made at decision block 84 as to whether a signal has arrived from the remote interface module 18. If it has, the timer is reset, as indicated by block 86, as is a cycle counter. Then, control exits to the main sequence illustrated in the flow diagram of FIG. 3. By resetting the timer, a baseline is established for the 1/60th of a second period. After that, at succeeding 1/60th of a second intervals, the local microcontroller should be expecting another message from the remote interface module 18. If none is received, an error indication is provided, via indicator lights 174 and 176 (FIG. 1).

If at start-up, the test at decision block 84 indicates that no remote signal has arrived, the microcontroller 24 counts up another 1/60th of a second on its own and then checks to see if a remote signal has arrived yet. This is the function of the decision block 90. Control loops back over path 92 until such time as the test at decision block 90 shows that the elapsed time has exceeded one cycle. At that point, a test is made at block 94 to see if so much time has elapsed that a predetermined maximum count has been reached. The "max count value" is a programmable quantity. For example, if no signal has been returned from the remote end, in, say, one second, it is indicative that something is wrong at the remote end and indicator lights 174 and 176 again reflect the type of fault and manual intervention by way of trouble shooting takes place (block 96). Once the error condition is resolved, control returns to the input of block 82, via path 98.

Referring again to decision block 94, if the count has not reached the preprogrammed max count value, the voltage to the laser light source is incremented by one step at operation block 100. Decision block 102 tests whether the laser voltage is greater than or equal to the full rated power value for the laser. In this block FF is the hexadecimal representation equal to 256 (decimal) which comprises one full 8-bit word in machine code. If the laser voltage is greater than full power, it is indicative that the laser is being over-powered and this constitutes another error condition involving manual intervention as represented by operation block 104. If, on the other hand, the laser voltage is not greater than its full rated value, control exits the decision block 102, via path 106, which leads to the input of the decision block 84.

It can be seen from the foregoing description of the flow diagram of FIG. 2 that there is a wake-up sequence for the local light source module 16. This wake-up sequence insures that all optical fibers are appropriately interconnected between the local light source module and the remote interface module before full power can be applied to the laser light source.

Referring next to the flow diagram of FIG. 3, the main routine executed by the microprocessor-based microcontroller 24 at the local site will be explained. First off, it should be recalled that in the power-up sequence, a timer has been set to zero so that relative time could be measured therefrom. Following the power-up sequence, messages should be arriving from the remote end every 16.6 milliseconds, i.e., 1/60th of a second, so the first box 108 involves waiting for a next message from the remote end.

In the implementation of the present invention, a message consists of six 8-bit bytes where the sixth byte contains the numeric sum of all the other bytes in the message as a check sum for error detection purposes. The use of check sums to indicate errors in the transmission of a message is a well established technique. FIG. 5 illustrates the format of a typical message and the interpretation of the bits of the 8-bit header byte.

If bit $B_0$ in the header is set, it is indicative that the system is configured to allow simultaneous transmission of both digital information and analog information using the so-called HART protocol. The $B_1$ bit is a transmitter voltage alarm which is set if there is an emergency condition. For example, if the leads on the transmitter should be inadvertently shorted out, header bit $B_1$ will be set and, in this fashion, the local interface unit 16 is advised so that corrective action can be taken.

Header bit $B_2$ is the photo-diode voltage alarm bit that checks on the status of the photo-diode voltage generated by the photo-diode in block 50 when illuminated by light transmitted over optical fiber 20. This voltage needs to be in a very narrow voltage range for insuring optimum power transfer efficiency. When bit $B_2$ is set, it is indicative that the photo-diode voltage is not within the desired range.

At predetermined intervals, a measurement of the photo-diode open circuit voltage is taken and if header bit $B_3$ is set, it is indicative that the message bits following provide information as to that measured open circuit voltage value.

Bit $B_4$ is a watchdog timer (WDT) bit which is employed in a conventional fashion to indicate that for some reason, the microprocessor may be involved in an endless loop. When the watchdog timer has timed out, $B_4$ is set to indicate to the local module 16 that some type of logical error condition exists in the microprocessor implementing the remote microcontroller 54.

Header bit $B_5$ is set when the voltage to the transmitter 14 has been turned on.

Header bit $B_6$ is a request from the remote microcontroller 54 that the laser interface module 16 apply full-rated laser power to the light source. Finally, bit B7 when set indicates that the remote interface module 18 is in a wake-up sequence.

If the "check sum OK" test at 110 is satisfied, the message header bits and the accompanying data packet comprising bytes 2, 3 and 5 of the message are read. See block 112. The test at decision block 114 causes the microprocessor in the microcontroller 24 to check bit B7 of the header and if it is set, the microprocessor in the microcontroller 24 causes the light source power supply 46 to increase the power delivered to the laser (block 116). A test is then made at decision block 118 to determine whether header bit $B_6$ is set representing a command to shift the laser power to its full-on value. The microcontroller 24 responds by setting the laser voltage to its rated full-power value (block 120).

The test at decision block 122 checks bit $B_3$ of the message header. If that bit had been set, then certain special photo-diode information is being sent back from the remote interface module for a special processing by the light source interface module 16. For example, the light source interface module can check to determine whether the photo-diode is actually operating at its proper operating point (block 124). Thus, if bit $B_3$ is set, and it is determined that the operating point of the photo-diode in the photo-diode power converter 50 is not optimum, a flag or an alarm is set (block 126) so that the alarm condition can be transmitted on to the microcontroller 24 and used to energize the indicator lamps 174 and 176 for diagnostic purposes.

Decision block 128 tests whether there has been a photo-diode voltage or transmitter voltage alarm that needs to be serviced. Appropriate remedial action must then be taken as represented by block 130.

If all of the tests represented by decision blocks 114, 118, 122 and 128 result in a "No" response, control moves to block 132 which represents the laser power control algorithm. As was previously mentioned, it is desirable to minimize the amount of laser power transmitted to the remote interface in order to increase the life of the laser light source. In implementing this function, a proportional integral control algorithm is used. More particularly, an error voltage is set to equal the present transmitter voltage minus the transmitter voltage set-point. The summing operation of error terms forms the integral term of the control algorithm. The net result is that the laser voltage is set to some constant $K_p$ times the error voltage plus an integral constant $K_i$ times the integral term. By using proportional plus integral control, it assures that the laser current will be quickly reset to where it should be and the integral term determines that the laser current approaches very closely the optimum value.

After the proper laser current has been determined or calculated, the laser current is sent out to a digital-to-analog converter (not shown) forming part of microcontroller 24 which directly controls the amount of current energizing the laser. (See operation blocks 134 and 136.) Control then loops back to the input of block 108 where the system awaits receipt of the next message.

Figure 4:
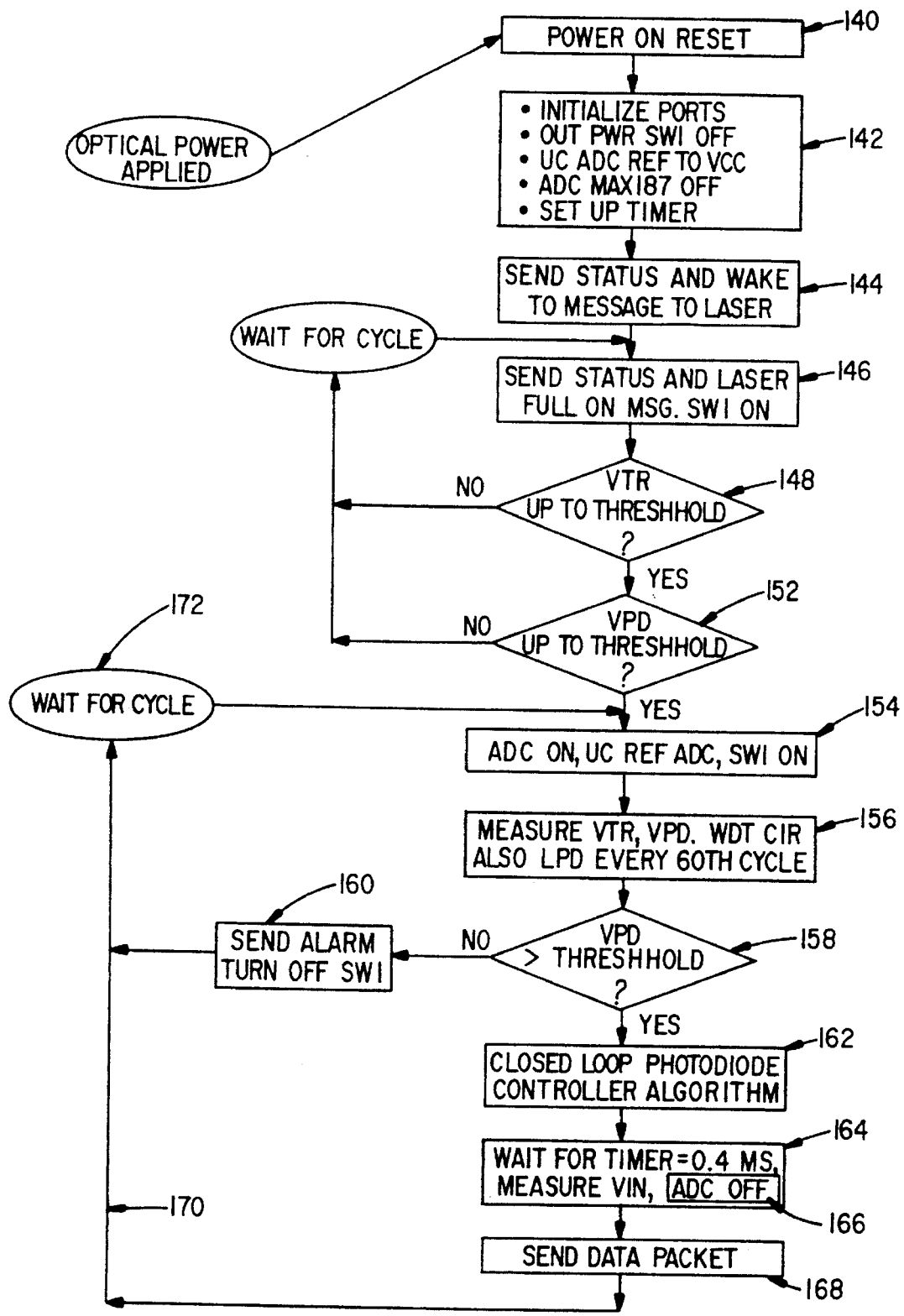
FIG. 4 is a software flow diagram illustrating the features of the program incorporated into the microcontroller means at the remote site.

FIG. 4 is a software flow diagram for the program executed by the microprocessor of the remote microcontroller 54 shown in FIG. 1. When the photo-diode power converter 50 detects that optical power is being ramped up and applied, via optical fiber 20, the photo-diode voltage begins to increase and the microprocessor wakes-up. This operation is represented by the power-on reset box 140 in FIG. 4. The power-on reset operation, in turn, initiates a number of housekeeping operations. For example, the input/output ports of the microprocessor in the microcontroller 54 needs to be initialized and an output power switch controlling the transmitter voltage must be turned off so that all available power is provided to the microcontroller and its associated electronics. Likewise, an analog-to-digital converter in circuit 58 is turned off to also conserve power. Finally, the cycle timer that measures the 16.66 millisecond intervals is initiated. These housekeeping operations are illustrated in block 142 of FIG. 4.

The microprocessor 54 then proceeds to send a status and wake-up message to the local light source interface, via optical fiber 22, as previously described. See block 144. This apprises the microcontroller 24 at the local site that the optical fibers are intact, at which point the laser or LED light source 42 is instructed to progress to its full power output. The voltage control switch (not shown) for the transmitter is then turned on, providing the PV sensor/transmitter 14 with the necessary electrical power to allow it to function.

Next, a test is made at decision 148 to determine whether the power being supplied to the PV sensor/transmitter 14 is up to a predetermined threshold. If not, control loops back to block 150 to wait one additional cycle before repeating steps 146 and 148. If the sensor/transmitter voltage is up to its threshold value, a test is made at block 152 to determine whether the photo-diode voltage from the photo-diode power converter circuit 50 is at its desired threshold value. Again, if it is not, control returns to block 150 and after a further cycle has elapsed, steps 146, 148 and 152 are repeated.

Once it is determined that both the sensor/transmitter voltage and the photo-diode voltage are at their desired threshold values, control enters the main remote interface loop. Specifically, the operations reflected in box 154 are carried out whereby the analog-to-digital converter in circuit 58 of FIG. 1 is turned on, as is an on-board A/D converter forming a part of the microcontroller 54. The on-chip A/D converter measures the transmitter voltage and the photo-diode voltage and digitizes those two parameters prior to transmission of the messages in a digital format to the local light source module 16. As is indicated in block 156, the watchdog timer is cleared and after each 60th cycle (one second intervals) the photo-diode current or some other photo-diode parameter is measured and transmitted back with the next message burst to the local light source interface module.

Following that, a test is made at decision block 158 to determine whether the photo-diode output voltage is exceeding its threshold, which is a programmed setpoint that is generally set at a couple of volts below its desired operating point. If the photo-diode voltage falls below that value, it represents an error condition and an alarm is sent to the local light control module (block 160) and, in addition, the switch controlling the application of voltage to the transmitter 14 is opened. If, on the other hand, the photo-diode voltage is above its threshold, control exits to block 162 and a closed loop photo-diode controller algorithm is executed. This algorithm measures the current photo-diode voltage and compares it against the open circuit photo-diode voltage. The operating photo-diode voltage may typically be several hundred millivolts below the open circuit voltage value in order to get maximum power out of the photo-diode. The closed loop photo-diode control algorithm 162 essentially sets the duty cycle of a DC to DC inductive switching converter contained in remote interface module 18 to either limit or increase the amount of current supplied to the photo-diode to bring its output voltage to its desired operating point.

Next, as represented by block 164, a predetermined time delay, e.g., 0.4 milliseconds, is provided in which the A/D converter in circuit Read Analog block 62 is allowed to power-up and stabilize. The analog output from the transmitter is then converted to a digital representation thereof after which the A/D converter can again be turned off to conserve power (block 166). The remote microcontroller 54 then controls the LED transmitter 64 to transmit all six bytes of the message back to the local light source interface (block 168) and then control exits, via path 170, where operation suspends until the next cycle is initiated by the timer circuitry (block 172). This reinitiates the main remote microprocessor control loop.

To assist in troubleshooting of the system, there is associated with the microcontroller 24 a plurality of indicator lights, such as LEDs 174 and 176 (FIG. 1). When the system is working properly, i.e., no transmitter fault or discontinuous optical loop, LED 174 will be off and LED 176 will be on. Had the optical loop failed, only LED 174 would be illuminated. If it were the PV transmitter that had failed, LEDs 174 and 176 will both be on. In the event of a power failure, both LEDs will be off. Finally, if system maintenance is needed, say, to replace the photo diode 50 or the laser driven by light source modulator 42, LED 174 will be off and LED 176 will intermittently flash.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An optically-powered, fiber-optical data-link for interfacing a remote process variable transmitter to a local control system, comprising;

(a) a first controller means for controllably applying light energy to a first output terminal and for receiving digitally encoded, optically transmitted messages at a first input terminal;

(b) transmitter means electrically connected to said first controller means for transmitting information to said local control system based upon said messages received at said first input terminal;

(c) a second controller means having input and output terminals, the second controller means being located remotely from said first controller means for receiving both analog and digital signal components defining the state of a process variable sensed by said remote process variable transmitter and delivering optically encoded digital messages and status information relating to the performance of said second controller means as a message packet to a output terminal of said second controller means, said optically encoded digital message information being based upon the analog and digital signal components defining the state of a process variable sensed by said remote process variable transmitter, said second controller means including a power supply means comprising an optical-to-electrical power converter connected to a power supply converter means for the second controller means and an output conductor, said output conductor being connected to a power supply converter means for supplying electrical power to a remote microcontroller means and said remote process variable transmitter;

(d) at least one optical fiber optically coupled between said first output terminal of the first controller means, said input terminal of said second controller means, said output terminal of the second controller means and said first input terminal of the first controller means; and (e) means coupled to said first controller means at said local site for reconstructing the optically encoded digital message information in said message packet into tis analog and digital components prior to being sent to the local control system.

2. The optically-powered, fiber-optical data-link as in claim 1 and further including:

(a) analog-to-digital converter means controlled by said second controller means for digitizing said analog signal components and said status information; and (b) message formatting means including means for translating analog and digital information formats into a common information protocol for assembling the digitized analog signal components and said digital signal components into said message packet.

3. The optically-powered, fiber-optional data-link, as in claim 2 wherein first and second optical fibers are respectively connected between said first output terminal of the first controller means and said input terminal of the second controller means and between said output terminal of the second controller means and said first input terminal of the first controller mans.

4. The optically-powered, fiber-optical data-link as in claim 1 wherein the analog component sent to said local control system is a voltage or current ion a range compatible with the local control system.

5. The optically-powered, fiber-optical data-link as in claim 1 wherein said first and second controller means each comprise a programmable microcontroller.

6. An optically-powered, fiber-optic data-link for interfacing a remote process variable transmitter to a local control system, comprising:

(a) a first controller means for controllably applying light energy to a first output terminal and for receiving digitally encoded optically transmitted information at a first input terminal;

(b) analog transmitter means electrically connected to said first controller means adapted for transmitting analog information to said local control system;

(c) a second controller means having input and output terminals, the second controller means being located remotely from said first controller means for receiving signals defining the state of a process variable sensed by said remote process variable transmitter and delivering optically encoded status information to the output terminal of the second controller means and including (i) a power supply means comprising an optical-to-electrical power converter connected to said input terminal of the second controller means and an output conductor, said output conductor being connected to a power supply converter means for supplying electrical power to a remote microcontroller means and said remote process variable transmitter;

(d) a first optical fiber coupled between said first output terminal of the first controller means and said input terminal of the second controller means;

(e) a second optical fiber coupled between said output terminal of the second controller means and said first input terminal of the first controller means; and (f) means including said first controller means for initially applying said light energy to said first output terminal at a standard, accepted eye-safe low light energy value, said second controller means being responsive to receipt of said standard, accepted eye-safe low light energy value over said first optical fiber for transmitting a power-up command to said first controller means over said second optical fiber, whereby additional light energy above said standard accepted eye-safe light energy value is applied to said first optical fiber only if said power up command is received indicating that said first and second optical fibers are properly connected between their respective output and input terminals.

7. The optically-powered, fiber-optic data-link as in claim 6 wherein said first controller means comprises:

(a) light source power supply means for electrically energizing a light source, said light source including means for modulating the intensity of the light energy delivered to said first output terminal of the first controller means and a first microprocessor for controlling said light source power supply means and said light source modulating means.

8. The optically-powered, fiber-optic data-link as in claim 7 and further including means controlled by said first controller means for delivering information signals to said local control system based upon said digitally encoded optically transmitted information delivered over said second optical fiber to said first input terminal of the first controller means.

9. The optically-powered, fiber-optic data-link as in claim 8 wherein said information signals delivered to said local control system are analog signals.

10. The optically-powered, fiber-optic data-link as in claim 8 wherein said information signals delivered to said local control system are digital signals.

11. The optically-powered, fiber-optic data-link as in any one of claims 6–10 and further including an optical-to-electrical transducer coupled to said first input terminal of the first controller means.

12. The optically-powered, fiber-optic data-link as in any one of claims 6–10 wherein said light source comprises a LED.

13. An optically-powered, fiber-optic data-link for interfacing a remote process variable transmitter to a local control system, comprising:

(a) a first con, roller means for controllably applying light energy to a first output terminal and for receiving digitally encoded optically transmitted information at a first input terminal;

(b) analog transmitter means electrically connected to said first controller means adapted for transmitting analog information to said local control system;

(c) a second con,roller means having input and output terminals, the second controller means being located remotely from said first controller means for receiving signals defining the state of a process variable sensed by said remote process variable transmitter and delivering optically encoded status information to said output terminal of the second controller means and including (i) a power supply means comprising an optical-to-electrical power converter connected to said input terminal of the second controller means and an output conductor, said output conduct or being connected to a power supply converter means for supplying electrical power to a remote microcontroller means and said remote process variable transmitter, said second controller means includes means for measuring and digitising electrical power delivered from said power supply means to said romote process variable transmitter and for digitizing the said signals defining the state of a process variable;

(d) a first optical fiber coupled between said first output terminal of the first means and said input terminal of the second controller means;

(e) a second optical fiber coupled between said output terminal of the second controller means and said first input terminal of the first controller means; and (f) means including said first controller means for initially applying said light energy to said first output terminal at a standard, accepted eye-safe low light energy value, said second controller means being responsive to receipt of said standard, accepted eye-safe low light energy value over said first optical fiber for transmitting a power-up command to said first controller means over said second optical fiber, whereby additional light energy above said standard accepted eye-safe light energy value is applied to said first optical fiber only if said power up command is received indicating that said first and second optical fibers are properly connected between their respective output and input terminals.

14. The optically-powered, fiber-optical data-link as in claim 6 wherein said eye safe low value of light energy is achieved by using low duty cycle light pulses.

15. An optically-powered, fiber-optical data-link for interfacing a remote process variable transmitter to a local control system, system, comprising:

(a) a first controller means for controllably applying light energy from a light source to a first output terminal and for receiving digitally encoded, optically transmitted messages at a first input terminal;

(b) input/output means electrically coupled to said first controller means for applying at least one of digital and analog information corresponding to said messages received at said first input terminal to said local control system;

(c) a second controller means having input and output terminals the second means being located remotely from said first controller means for receiving at least one of analog and digital signal components defining the state of a process variable sensed by said remote process variable transmitter and delivering message packets including optically encoded digital status information based upon said at least one of analog and digital signal components to the output terminal of the second controller means at periodic intervals to indicate proper operation of said second controller means, and said remote process variable transmitter to the first controller means;

(d) a power supply means comprising an optical-to-electrical power converter connected to said input terminal of the second controller means and an output conductor, said output conductor being connected to a power supply converter means for supplying electrical power to a remote microcontroller means and said remote process variable transmitter; and (e) at least one optical fiber coupled between said first output terminal and said input terminal of the second controller means and between said output terminal of the second controller means and said first input terminal, respectively, said status information in said message packet sent from said output terminal of the second controller means to said first input terminal being indicative of the level of power produced by said power supply means.

16. The optically-powered, fiber-optical data-link as in claim 15 wherein said first controller means controls the light energy delivered to said first output terminal in response to said status information.

17. An optically-powered, fiber-optical data-link for interfacing a remote process variable transmitter to a local control system, comprising:

(a) a first controller means for controllably applying light energy from a light source to a first output terminal and for receiving digitally encoded, optically transmitted messages at a first input terminal;

(b) input/output means electrically coupled to said first controller means for applying at least one of digital and analog information corresponding to said messages received at said first input terminal to said local control system;

(c) a second controller means having input and output terminals, the second controller means being located remotely from said first controller means for receiving at least one of analog and digital signal components defining the state of a process variable sensed by said remote process variable transmitter and delivering message packets including optically encoded digital status information based upon said at least one of analog and digital signal components to the output terminal of the second controller means at periodic intervals to indicate proper operation of said second controller means, and said remote process variable transmitter to the first controller means;

(d) a power supply means comprising an optical-to-electrical power converter connected to said input terminal of the second controller means and an output conductor, said output conductor being connected to a power supply converter means for supplying electrical power to a remote microcontroller means and said remote process variable transmitter; and (e) at least one optical fiber coupled between said first output terminal and said input terminal of the second controller means and between said output terminal of the second controller means and said first input terminal, respectively, said status information in said message packet sent from said output terminal of the second controller means to said first input terminal being indicative of the level of power produced by said power supply means; and (f) alarm means in said first controller means for indicating when the status information indicates a level of power produced by said power supply means is outside of predetermined upper and lower limits.

18. The optically-powered, fiber-optical data-link as in claim 17 wherein said first controller means includes means for adjusting the light energy produced by said light source to a minimum value necessary to provide operating potentials to said second controller means and said process variable transmitter.

19. The optically-powered, fiber-optical data-link as in claim 17 and further including means for interrupting the electrical power delivered to said remote process variable transmitter in the event the level of power delivered by said power supply means falls below said lower limit.

20. The optically-powered, fiber-optical data-link as in claim 15 wherein said input/output means applies said analog information to said local control system as a voltage or current in a range compatible with the local control system.

21. The optically-powered, fiber-optical data-link as in claim 15 wherein said first and second controller means each comprise a programmable microcontroller.

22. The optically-powered fiber-optical data-link as in claim 15 wherein the status information is indicative of proper operation of said at least one optical fiber.

23. The optically-powered fiber-optical data-link as in claim 15 and further including means for monitoring the energy output of said light source.

* * * * *

UNITED STATES PATENT AND TRADEMARK OFFICE
CERTIFICATE OF CORRECTION

PATENT NO. : 5,528,409
DATED : June 18, 1996
INVENTOR(S) : Cucci et al.

It is certified that error appears in the above-indentified patent and that said Letters Patent is hereby corrected as shown below:

Column 11, line 7, delete "a" (second occurrence) and put instead -- said --.

Column 11, line 28, delete "tis" and put instead -- its --.

Column 11, line 41, delete "fiber-optional" and put instead -- fiber-optical --.

Column 13, line 4, delete "con,roller" and put instead -- controller --.

Column 13, line 15, delete "conduct or" and put instead -- conductor --.

Column 13, line 20, delete "digitising" and put instead -- digitizing --.

Column 13, line 25, after "first" insert -- conductor --.

Column 13, line 49, delete "system,".

Column 12, line 64, delete "con,roller" and put instead -- controller --.

Signed and Sealed this

Seventeenth Day of September, 1996

Attest:

BRUCE LEHMAN

Attesting Officer     Commissioner of Patents and Trademarks